(12) United States Patent
Jeong et al.

(10) Patent No.: US 8,700,043 B2
(45) Date of Patent: Apr. 15, 2014

(54) APPARATUS AND METHOD FOR CONNECTING RADIO LINK IN WIRELESS COMMUNICATION SYSTEM HAVING PRIVATE NETWORK CELL

(75) Inventors: Kyeong-In Jeong, Suwon-si (KR); Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 400 days.

(21) Appl. No.: 12/672,641

(22) PCT Filed: Aug. 7, 2008

(86) PCT No.: PCT/KR2008/004599
§ 371 (c)(1),
(2), (4) Date: Feb. 8, 2010

(87) PCT Pub. No.: WO2009/020362
PCT Pub. Date: Feb. 12, 2009

(65) Prior Publication Data
US 2011/0177815 A1 Jul. 21, 2011

(30) Foreign Application Priority Data
Aug. 8, 2007 (KR) ............... 10-2007-0079813

(51) Int. Cl.
*H04W 36/00* (2009.01)
*H04W 40/00* (2009.01)
(52) U.S. Cl.
USPC ..................... 455/444; 455/436

(58) Field of Classification Search
USPC ........................... 455/444, 436
See application file for complete search history.

(56) References Cited

U.S. PATENT DOCUMENTS

| 7,248,600 | B2 | 7/2007 | Benveniste | |
|---|---|---|---|---|
| 2004/0005890 | A1* | 1/2004 | Holma et al. | 455/424 |
| 2004/0121770 | A1* | 6/2004 | Tigerstedt et al. | 455/436 |
| 2005/0233715 | A1 | 10/2005 | Laroia et al. | |
| 2006/0270402 | A1* | 11/2006 | Kubo | 455/425 |
| 2008/0214225 | A1 | 9/2008 | Choukroun et al. | |

FOREIGN PATENT DOCUMENTS

| CN | 1 437 416 | 8/2003 |
|---|---|---|
| CN | 1662096 | 8/2005 |
| EP | 1578162 A1 | 9/2005 |
| FR | 2 875 077 | 3/2006 |
| KR | 1020060042241 | 5/2006 |
| WO | WO 02/47361 | 6/2002 |
| WO | WO 02/089502 | 11/2002 |
| WO | WO 2007/004051 | 1/2007 |

* cited by examiner

*Primary Examiner* — Ariel Balaoing
(74) *Attorney, Agent, or Firm* — The Farrell Law Firm, P.C.

(57) ABSTRACT

Disclosed is a method of connecting a radio link of a UE in a wireless communication system including a first cell and a second cell partially or completely overlapping the first cell, the method including the steps of, when the UE fails in connecting a radio link to the first cell for a given time, performing measurement for the second cell by using pre-stored radio link connection information for the second cell; and if a result of the measurement satisfies given cell selection conditions, selecting the second cell.

11 Claims, 10 Drawing Sheets

APPARATUS AND METHOD FOR CONNECTING RADIO LINK IN WIRELESS COMMUNICATION SYSTEM HAVING PRIVATE NETWORK CELL

BACKGROUND OF THE INVENTION

1. Field of the Invention

The present invention relates to an apparatus and method for connecting a call in a wireless communication system, and more particularly to an apparatus and method for connecting a radio link in a wireless communication system.

2. Description of the Related Art

A cellular mobile communication system may be mentioned as a typical example of a wireless communication system. This cellular mobile communication system has been developed to provide users with voice communications wherever they are located. However, in line with the rapid growth of wireless communication technology, the wireless communication system has evolved in the form of a system that can provide mass data at high speed according to demands of users who want to be provided with mass data at high speed.

Such a wireless communication system may be broadly divided into the North American mobile communication system employing a synchronous scheme and the European mobile communication system employing an asynchronous scheme. The UMTS (Universal Mobile Telecommunication Service) system belonging to the European mobile communication system is a $3^{rd}$ generation asynchronous mobile communication system which is based on GSM (Global System for Mobile Communications) and GPRS (General Packet Radio Services) and employs a WCDMA (Wideband Code Division Multiple Access) scheme. The 3GPP ($3^{rd}$ Generation Partnership Project) responsible for UMTS standardization is currently discussing LTE (Long Term Evolution) as a next generation mobile communication of the UMTS. LTE with an aim of commercialization by around 2010 is technology for implementing high-speed packet-based communication with a transfer rate of max. 100 Mbps.

In order to satisfy the above conditions, various plans for applying to the LTE system are under discussion, including a plan to reduce the number of nodes located on a communication path by simplifying a network architecture, a plan to approximate wireless protocols to a radio channel as close as possible, and so forth.

Figure 1:
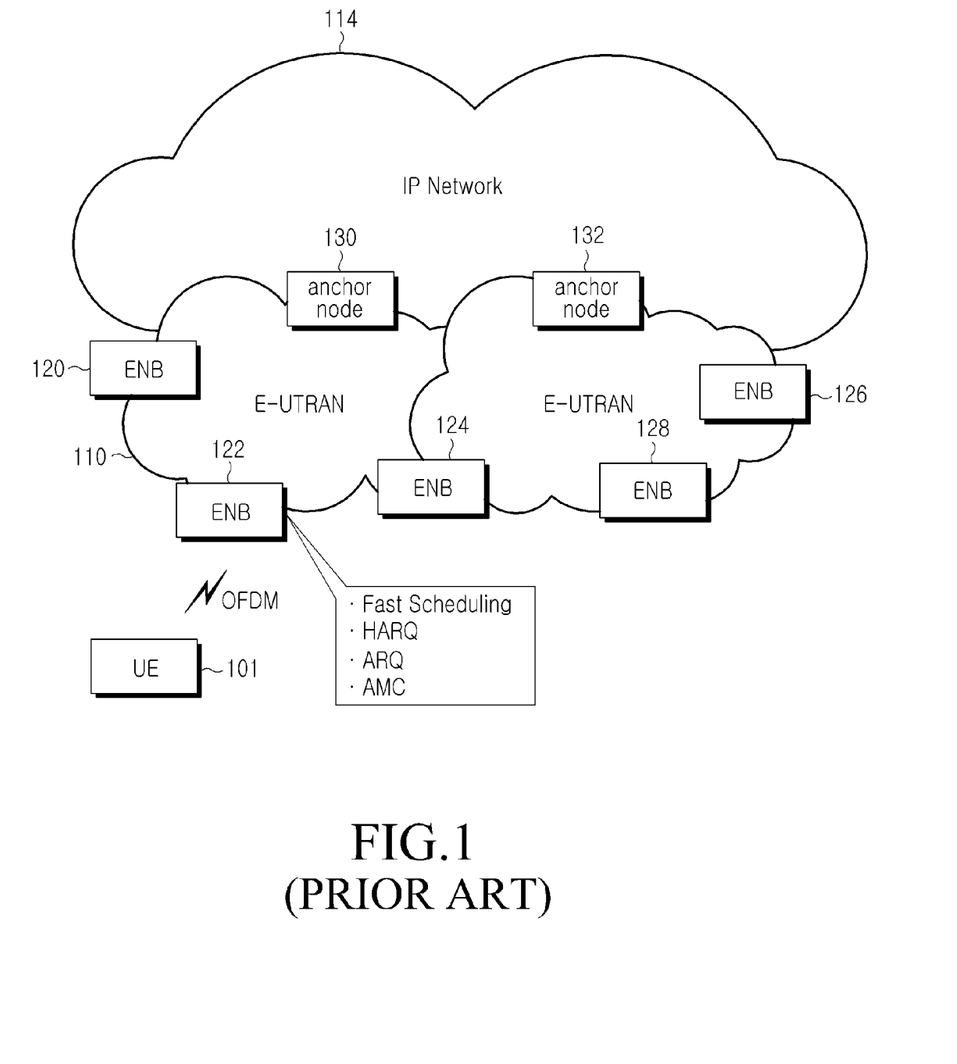
FIG. 1 is a view illustrating an example of a structure of an evolved UMTS mobile communication system.

FIG. 1 illustrates an example of a structure of an evolved UMTS mobile communication system.

As illustrated in FIG. 1, an evolved UMTS radio access network (hereinafter referred to as "E-UTRAN") 110 has a simplified two node structure of evolved Nodes B (hereinafter referred to as "ENB") 120, 122, 124, 126, 128 and anchor nodes 130, 132. A user equipment (hereinafter referred to as "UE" or "terminal") 101 can access an internet protocol (hereinafter referred to as "IP") network via the E-UTRAN 110 and a radio link.

The ENBs 120 to 128 correspond to the existing Nodes B of the UMTS system, and is connected to the UE 101 over a radio channel. The ENBs 120 to 128 discussed in the LTE system perform more complex functions than the existing Nodes B. In LTE, since all user traffics including a real-time service over an IP, such as a VoIP (Voice over IP) service, are serviced via a shared channel, an apparatus for collecting situation information of UEs and scheduling the UEs is needed, and each of the ENBs 120 to 128 functions as such an apparatus. Also, one ENB usually controls a plurality of cells, and each ENB performs adaptive modulation and coding (hereinafter referred to as "AMC") in which a modulation scheme and a channel coding rate are determined adaptively to the channel state of a UE.

Similar to HSDPA (High Speed Downlink Packet Access) or HSUPA (High Speed Uplink packet Access, also referred to as E-DCH (Enhanced Dedicated Channel)), HARQ (Hybrid ARQ) is also performed between each ENB 120 to 128 and the UE 101 in LTE. However, since various quality of service (hereinafter referred to as "QoS") requirements cannot be satisfied by the HARQ alone, a separate ARQ (outer-ARQ) in an upper layer may be performed between the UE 101 and each ENB 120 to 128.

Reference will now be made to a mobile communication including home cell/private network cells and public cells. A cellular communication system, an example of a mobile communication system, is widely used because it improves frequency use efficiency by dividing a service area into a plurality of cells. One cell under the control of a base station provides communication services to UEs located in the corresponding cell through the base station. In some cases, the system may be configured in such a manner that there are small-scale cells, each of which takes charge of an area smaller than the cell and is accessible by specific UEs.

An example of such small-scale cells is a cell that covers specific UEs in an area, the scale of which corresponds to any home or office, and this small-scale cell is called a home/cell/private network cell. In contrast to this, a typical cell that covers all UEs within the cell area of a base station is called a public cell. The home cell/private network cell may be used when it has an effect of reducing service costs. However, the home cell/private network cell described herein is merely an example of a cell for promoting the understanding of the present invention, and the present invention should not be construed as limited to the home cell/private network cell and the public cell. For convenience's sake, the term "home cell/private network cell" will be briefly referred to as "private cell" in the following description.

Figure 2:
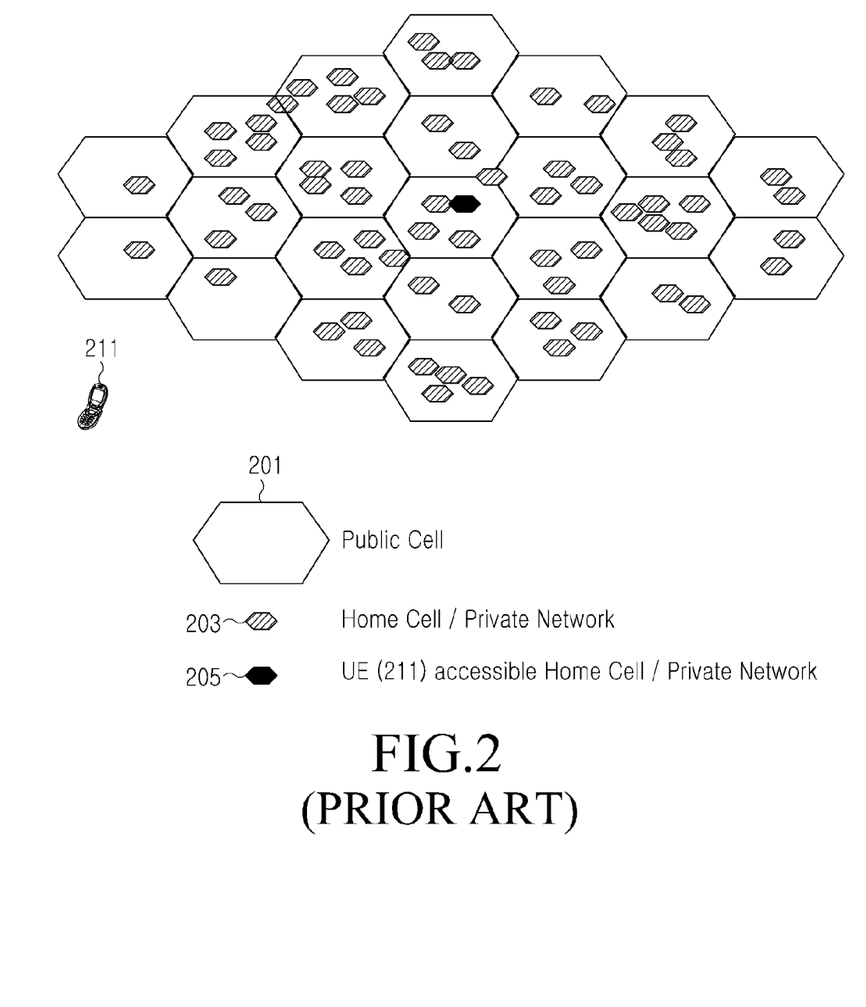
FIG. 2 is a view for explaining an example of a typical arrangement of private cells and public cells.

FIG. 2 illustrates an example of a typical arrangement of private cells and public cells.

Reference numeral "201" designates public/macro cells, reference numeral "203" designates private cells accessible by specific UE(s), and reference numeral "205" designates a private cell assessable by a UE 211. As illustrated in FIG. 2, the public cells may overlap the private cells. With regard to this, the public cells and the private cells may be operated with different frequency allocations or the same frequency allocation (hereinafter referred to as "FA"). A specific UE may fail in connecting a radio link to a private cell in the process of accessing the corresponding private cell. Hereinafter, a description will be given of how a UE operates when failing in connecting a radio link due to any cause in the process of accessing a private cell. Here, a failure in connecting a radio link means a state where it is impossible for a UE to communicate with a serving cell currently providing the UE with services or an ENB controlling a cell in which the UE is currently located.

Figure 3:
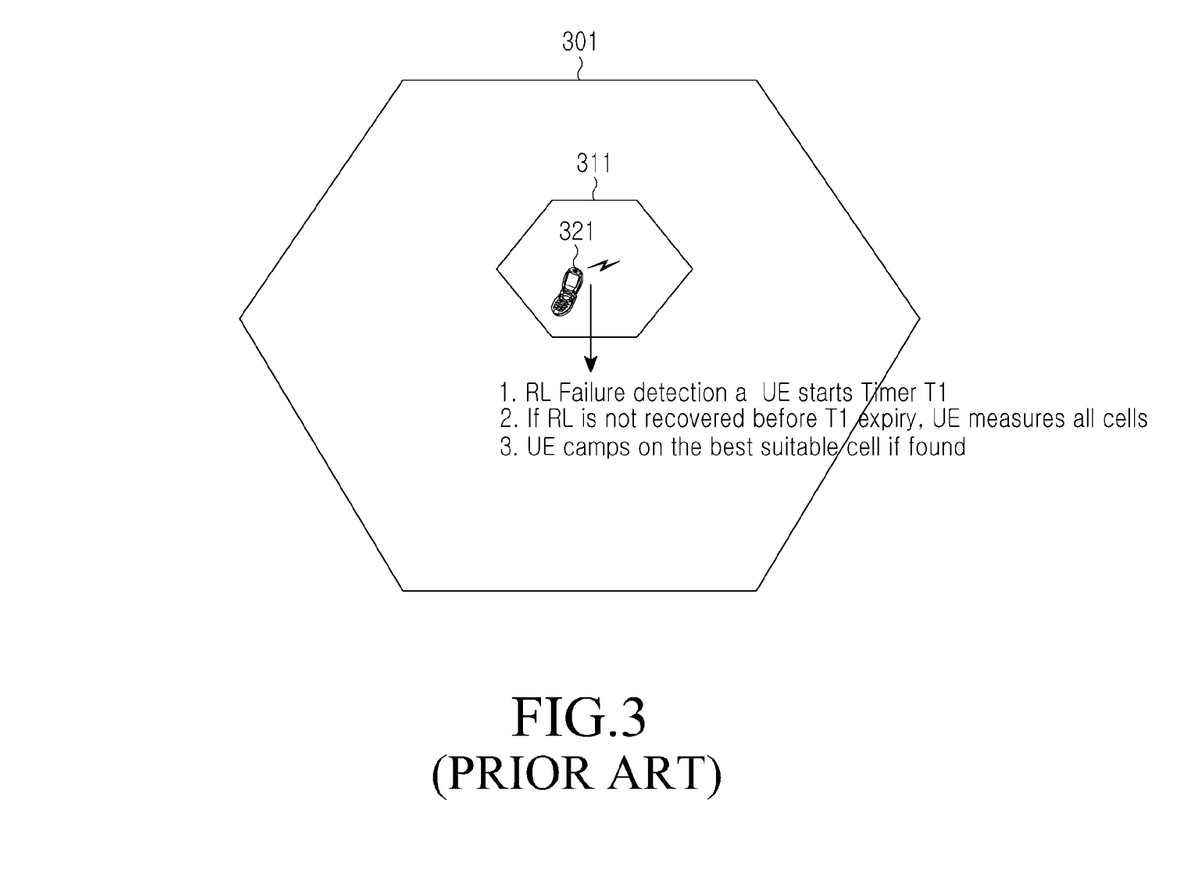
FIG. 3 is a view for explaining how a UE operates when failing in connecting a radio link to a private cell.

FIG. 3 illustrates how a UE operates when failing in connecting a radio link to a private cell.

Reference numeral "311" designates a private cell in which the UE 321 is currently located, or which currently provides the UE 321 with services, and reference numeral "301" designates a public cell overlapping the private cell 311. The operation of the UE involves the following three steps specified by numerals "1", "2", and "3" in FIG. 3.

1. In the step, if the UE 321 detects a failure in connecting a radio link in the process of receiving services from the private cell 311, it operates a timer T1 that is set to a given time period.

2. In the second step, if the radio link, the connection of which has failed, is not recovered until the given time period expires, the UE 321 measures signal strengths for all cells including intra-frequency cells and inter-frequency cells. The signal strengths measured by the UE 321 may be reference signal strengths, such as pilot signal strengths. Here, the intra-frequency cells refer to cells that have the same FA as that of the cell in which the UE is currently located, and the inter-frequency cells refer to cells that have different FAs from that of the cell in which the UE is currently located.

3. In the third step, the UE 321 analyzes the measured signal strengths, and selects or reselects a suitable cell that has the best radio channel state and is currently accessible by the UE 321 (cell selection or cell reselection).

The suitable cell refers to a cell that, as a result of measurement for a radio channel state, has a measurement value equal to or higher than a minimum threshold value required for cell selection or cell reselection, called "Scriteria", and is currently accessible by the UE. It is possible to refer to the 3GPP standard 25.304 for the Scriteria and the suitable cell, so a detailed description thereof will be omitted herein. Here, the cell refers to a public cell. In the following description, a cell does not mean a private cell, but means a public cell, unless particularly mentioned. Also, for the convenience of explanation, "selection" is used as a concept covering "reselection".

As discussed above, if a UE operates as described in FIG. 3 when failing in connecting a radio link to a private cell, there is a problem in that the UE must measure signal strengths for all cells including intra-frequency cells and inter-frequency cells, and thus a large time delay occurs until a suitable cell is selected. Also, in the case of a mobile terminal using a battery, the power consumption of the battery is considerably increased when the mobile terminal measures signal strengths for all cells, as described in FIG. 3, which causes a problem of reducing the available time for the mobile terminal.

SUMMARY OF THE INVENTION

Accordingly, the present invention has been made to solve at least the above-mentioned problems occurring in the prior art, and the present invention provides an apparatus and method capable of reducing the cell selection time of a mobile terminal.

Further, the present invention provides an apparatus and method capable of reducing power consumption caused by cell selection in a mobile terminal used in a wireless communication system.

In accordance with an aspect of the present invention, there is provided a method of connecting a radio link of a UE in a wireless communication system including a first cell and a second cell partially or completely overlapping the first cell, the method including the steps of, when the UE fails in connecting a radio link to the first cell for a given time, performing measurement for the second cell by using pre-stored radio link connection information for the second cell; and if a result of the measurement satisfies given cell selection conditions, selecting the second cell.

In accordance with another aspect of the present invention, there is provided an apparatus for connecting a radio link of a UE in a wireless communication system including a first cell and a second cell partially or completely overlapping the first cell, the apparatus including a timer having a preset time period value; a cell information manager for storing and providing radio link connection information for the second cell; a radio link failure detector for driving the timer when a failure in connecting a radio link to the first cell is detected, and outputting a radio link failure message when the failure in connecting the radio link to the first cell is maintained until the preset time period value of the timer expires; a cell information manager for outputting the radio link connection information for the second cell in response to the output radio link failure message; and a measurement unit for selecting the second cell according to the output radio link connection information for the second cell.

In accordance with yet another aspect of the present invention, there is provided an apparatus for connecting a radio link of a UE in a wireless communication system including a first cell and a second cell partially or completely overlapping the first cell, the apparatus including a timer having a preset time period value; a cell information manager for storing radio link connection information for the second cell; and a controller for driving the timer when a failure in connecting a radio link to the first cell is detected, and selecting the second cell according to the stored radio link connection information for the second cell when the failure in connecting the radio link to the first cell is maintained until the preset time period value of the timer expires.

In accordance with still yet another aspect of the present invention, there is provided a method of connecting a radio link of a Node B in a wireless communication system including a first cell and a second cell partially or completely overlapping the first cell, the method including the steps of determining if a UE needs to handover to the first cell, by using a measurement message received from the UE and prestored radio link connection information for the first cell; and when the UE needs to handover to the first cell, transmitting prestored radio link connection information for the second cell to the UE.

In accordance with still yet another aspect of the present invention, there is provided an apparatus for connecting a radio link of a Node B in a wireless communication system including a first cell and a second cell partially or completely overlapping the first cell, the apparatus including a cell information manager for storing radio link connection information for the first cell and radio link connection information for the second cell; a handover determiner for determining if a UE needs to handover to the first cell, by using a measurement message received from the UE and the stored radio link connection information for the first cell, and receiving the stored radio link connection information for the second cell transferred from the cell information manager and outputting the received radio link connection information for the second cell when the UE needs to handover to the first cell; and an L3 message generator for transmitting a handover message including the radio link connection information for the second cell, output from the handover determiner, through a transceiver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

Prior to describing the present invention in detail, a brief description will be given of the concept of the present invention.

In the present invention, when a UE is connected to a private cell or attempts to connect to the private cell, it receives and stores radio link connection information for public cells overlapping the private cell. Subsequently, if the connection of a radio link to the private cell is released and is not recovered for a given time, the UE performs measurement for the public cells by using the stored radio link connection information for the public cells. If a measurement value for any public cell is equal to or higher than a predetermined threshold value and the public cell is accessible by the UE, the UE selects the public cell, and newly established a radio link to the selected public cell by using the radio link connection information for the public cell. If there are a plurality of selectable public cells, then a public cell that has the best measurement value is selected. Hereinafter, the present invention will be described in detail, based on the above concept.

In the present invention, in order to solve the problem described in FIG. 3, a UE must store radio link connection information for public/macro cell(s) overlapping a private cell, such as FA (Frequency Allocation) information, a physical/higher layer cell ID, code information for a sync channel (hereinafter referred to as "SCH") and a pilot channel, and cell configuration information, when moving to the private cell.

When the UE fails in connecting a radio link to the private cell, it measures signal strengths for the public/macro cells overlapping the private cell by using the stored radio link connection information (hereinafter referred to as "measurement"). Also, if there is a suitable cell that has a measurement value equal to or higher than a specific threshold value and is accessible by the UE, the UE selects the cell. With regard to this, if there are a plurality of suitable cells, each of which has a measurement value equal to or higher than a specific threshold value and is accessible by the UE, the UE selects a cell having the best radio channel state, that is the best measurement value, from among the plurality of suitable cells.

If the UE stores radio link connection information for one public/macro cell, it may directly camps on that public/macro cell without performing measurement for the public/macro cell.

Reference will now be made to first and second exemplary embodiments of the present invention. The first embodiment is different from the second embodiment in that the first embodiment assumes one public/macro cell and the second embodiment assumes a plurality of public/macro cells.

Figure 4:
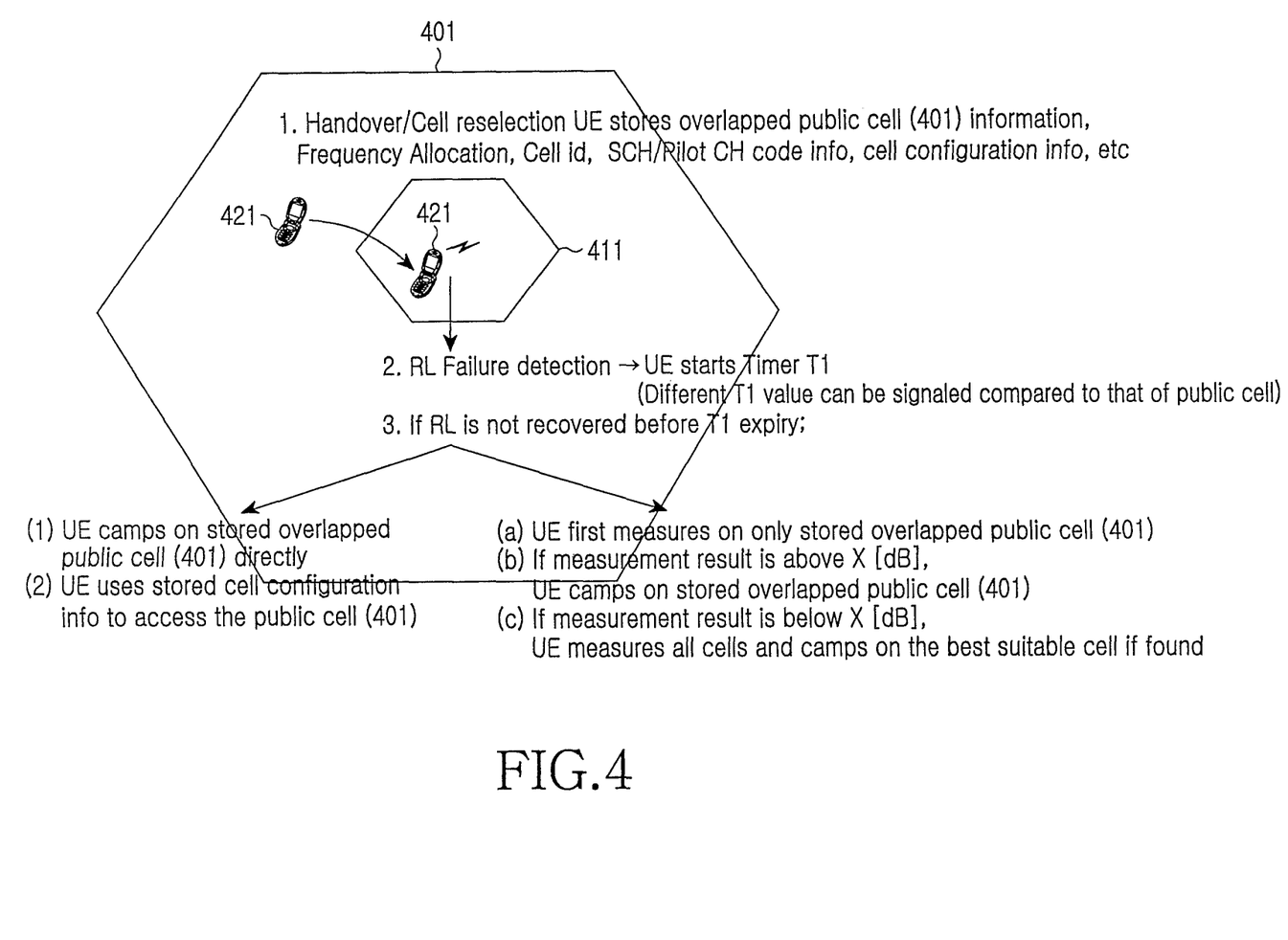
FIG. 4 is a view for explaining how a UE operates when failing in connecting a radio link to a private cell in accordance with a first exemplary embodiment of the present invention.

FIG. 4 illustrates how a UE operates when failing in connecting a radio link to a private cell according to the first embodiment of the present invention.

Reference numeral "411" designates a private cell accessible by the UE 421, and reference numeral "401" designates a public cell overlapping the private cell 411. FIG. 4 illustrates a case where one public cell overlaps a private cell accessible by the UE 421.

1. In the first step, if the UE 421 performs handover to the private cell 411 or cell selection, it stores radio link connection information for the public cell 401 overlapping the private cell 411. The radio link connection information for the public cell 401 includes FA information, a physical/higher layer cell ID, code information for an SCH and a pilot channel, cell configuration information, etc. The radio link connection information for the public cell 401 overlapping the private cell 411 may be signaled from a network, or the UE may acquire the same through measurement.

2. In the second step, if the UE 421 fails in connecting a radio link to the private cell 411 in the process of receiving services from the private cell 411 after moving to the private cell 411 according to the handover or cell selection, a timer T1 set to a given time period value starts to operate. In the present invention, a separate timer T1 for a private cell, which has a different time period value from that for a public cell, may be used.

3. In the third step, the UE 421 checks if the given time period value of the timer T1 expires before the radio link is recovered. If the time period value of the timer T1 expires before the radio link is recovered, the UE 421 operates along one of two paths illustrated in FIG. 4. That is, the UE 421 performs steps (1) and (2) along the left path, or performs steps (a), (b), and (c) along the right path.

First, steps (1) and (2) along the left path will be discussed.
 (1) If the radio link is not recovered until the given time period value of the timer T1 expires, the UE 421 directly camps on the public cell 401 according to the stored radio link connection information before performing handover to the private cell 411 or cell selection. That is, instead of performing measurement for all other cells, the UE 421 directly camps on the stored public cell 401, (2) When the UE 421 directly camps on the public cell 401, there is an advantage in that the UE 421 can use the radio link connection information for the public cell 401, stored in the first step.

Next, steps (a), (b), and (c) along the right path will be discussed.

(a) If the radio link is not recovered until the given time period value of the timer T1 expires, the UE 421 performs measurement for the public cell 401 by using the stored radio link connection information for the public cell 401 (FA information, a physical/higher layer ID, code information for an SCH and a pilot channel, etc.) before performing handover to the private cell 411 or cell selection. That is, instead of performing measurement for all other cells as in the prior art, the UE performs measurement for the public cell 401 by using the stored radio link connection information for the public cell 401.

(b) If the radio channel state of the public cell 401 is better than a predetermined threshold value, as a result of the measurement for the public cell 401, the UE 421 camps on the public cell 401.

(c) If the radio channel state of the public cell 401 is worse than the predetermined threshold value, as a result of the measurement for the public cell 401, the UE performs measurement for all cells including intra-frequency cells and inter-frequency cells for the first time. Also, the UE selects a suitable cell that has the best radio channel state and is accessible by the UE 421. Here, the predetermined threshold value may be signaled from a network, or may be fixedly determined by one predetermined value.

As described above, a difference between the left path (steps (1) and (2)) and the right path (steps (a), (b), and (c)) is as follows: In the left path, when a UE stores radio link connection information for one overlapped public cell, it directly camps on the public cell without performing measurement for the public cell. Contrarily, in the right path, although a UE stores radio link connection information for one overlapped public cell, it performs measurement for the public cell, and then camps on the public cell only when the radio channel state of the public cell is better than a predetermined threshold value, as a result of the measurement for the public cell.

Reference will now be made to the second embodiment of the present invention. Dissimilar to the first second embodiment, the second embodiment assumes a plurality of public cells overlapping a private cell, as mentioned above.

Figure 5:
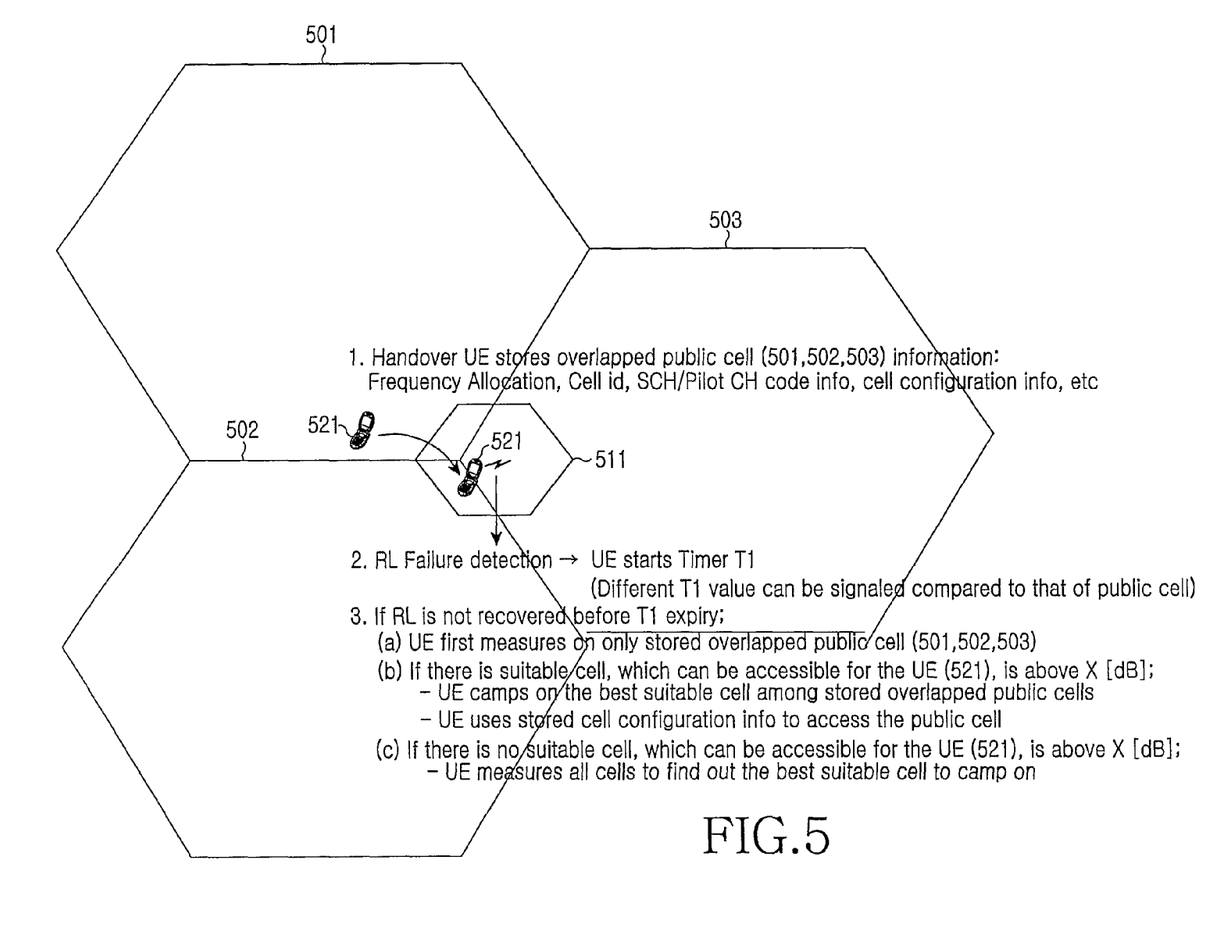
FIG. 5 is a view for explaining how a UE operates when failing in connecting a radio link to a private cell in accordance with a second exemplary embodiment of the present invention.

FIG. 5 illustrates how a UE operates when failing in connecting a radio link to a private cell.

Reference numeral "511" designates a private cell accessible by the UE 521, and reference numerals "501", "502", and "503" designate public cells overlapping the private cell 511. Hereinafter, steps 1, 2 and 3 illustrated in FIG. 5 will be discussed.

1. In the first step, if handover to the private cell 411 or cell selection occurs, the UE 521 stores radio link connection information for the public cells 501, 502, 503 overlapping the private cell 511. The radio link connection information for the public cells 501, 502, 503 includes FA information, a physical/higher layer cell ID, code information for an SCH and a pilot channel, cell configuration information, etc. The radio link connection information for the public cells 501, 502, 503 overlapping the private cell 411 may be signaled from a network, or the UE may acquire the same through measurement.

2. In the second step, if the UE 521 fails in connecting a radio link to the private cell 511 in the process of receiving services from the private cell 511 after moving to the private cell 511 according to the handover or cell selection, a timer T1 set to a given time period value and provided in the UE 521 starts to operate. In the present invention, a separate timer T1 for a private cell, which has a different time period value from those for public cells, may be used.

3. In the third step, if the radio link is not recovered until the given time period value of the timer T1 expires, the UE 521 performs steps (a), (b), and (c).

In step (a), the UE 521 performs measurement by using the radio link connection information stored in the first step before performing handover or cell selection. Here, the radio link connection information is information for the public cells 501, 502, 503 overlapping the private cell 511. As mentioned above, the radio link connection information for the public cells 501, 502, 503 includes FA information, a physical/higher layer cell ID, code information for an SCH and a pilot channel, cell configuration information, etc.

That is, the UE 521 performs measurement for the public cells 501, 502, 503 by using the radio link connection information. In other words, measurement for all cells is performed in the prior art, but measurement for only public cells 501, 502, 503 related to stored radio link connection information is performed in the present invention.

Subsequently, in step (b), if two or more public cells among the public cells 501, 502, 503 have the resultant measurement value equal to or higher than a predetermined threshold value and are accessible by the UE 521, the UE 521 selects one cell having the best radio channel state. After one cell is selected in this way, the stored radio link connection information for the selected cell can be reused.

Contrarily, if there is no suitable cell that has the resultant measurement value equal to or higher than the predetermined threshold value and is accessible by the UE 521, the UE performs measurement for all cells including intra-frequency cells and inter-frequency cells in the same manner as the prior art. Here, the predetermined threshold value may be signaled from a network, or may be fixedly determined by one predetermined value. Subsequently, the UE 521 selects a suitable cell that has the best radio channel state, as a result of the measurement for all cells, and is accessible by the UE 521.

As described above, FIGS. 4 and 5 illustrate embodiments in which radio link connection information for overlapped public cells is stored in a UE before the UE moves to a private cell. However, as an alternative embodiment of the present invention, after a UE moves to a private cell, radio link connection information for overlapped public cells may be signaled from a network, or the UE may acquire and store the same through measurement.

Figure 6:
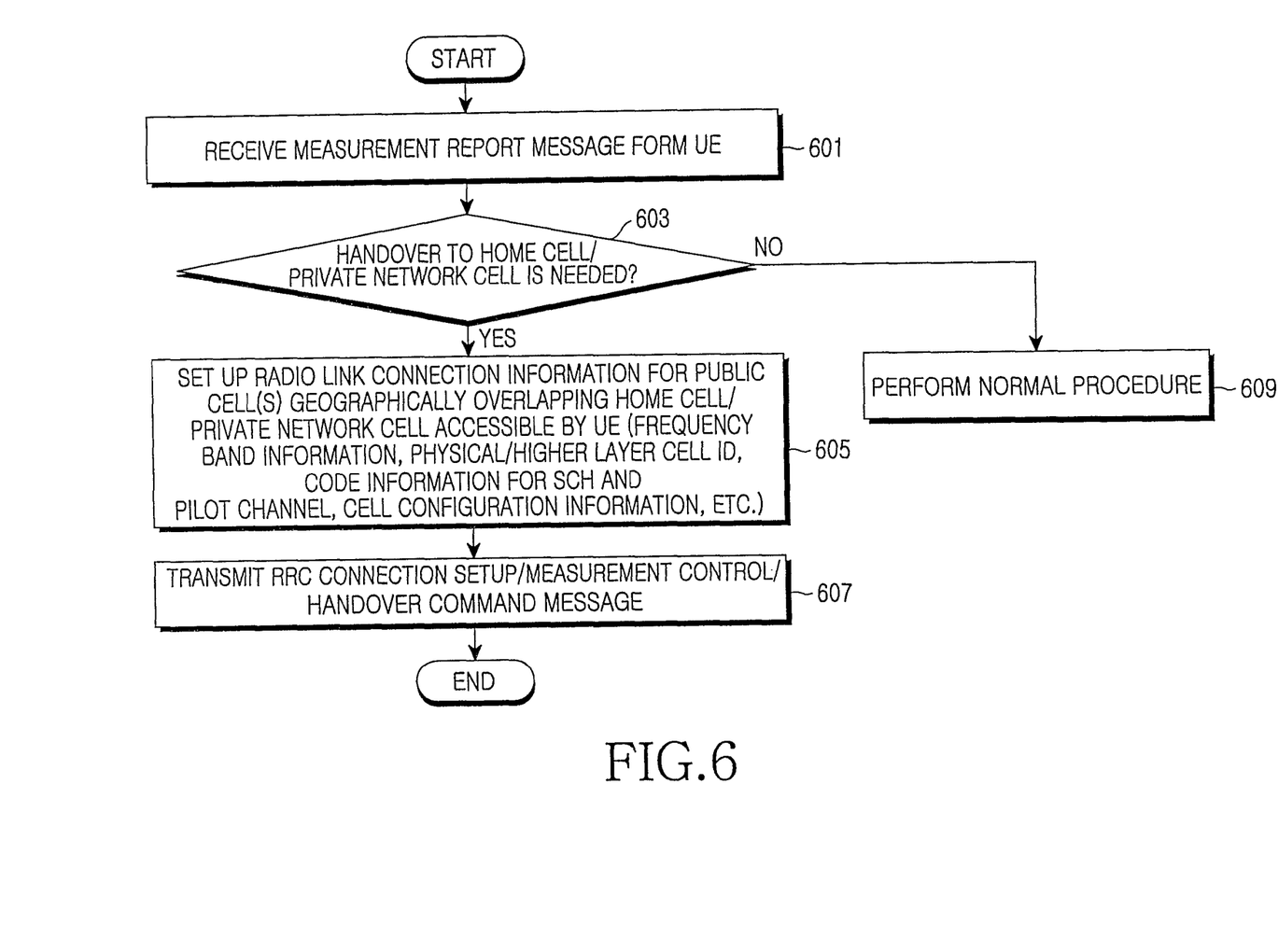
FIG. 6 is a flowchart illustrating an operation of a network node in accordance with an exemplary embodiment of the present invention.

FIG. 6 illustrates an operation of a network node according to an exemplary embodiment of the present invention.

In the present invention, the network node may be usually a base station controller. For example, the network node may be an ENB of the 3GPP LTE system or an RNC of the UMTS system. However, in some case, the network node may also be a Node B. Hereinafter, FIG. 6 will be described in detail.

In step 601, the network node receives a measurement report message from a UE.

In step 603, the network node determined if the UE needs to handover to a private cell, by using the received measurement report message and radio link connection information for the private cell. With regard to this, since the radio link connection information for the private cell and radio link connection information for public cells are prestored in the network node, the radio link connection information for the private cell can be used for the handover determination in step 603.

If the UE needs to handover to the private cell, the network node proceeds to step 605. Otherwise, that is, if the UE needs to handover to not the private cell, but a public cell, or handover is not needed, the network node proceeds to step 609, and performs a normal procedure. This is not a concern of the present invention, so a description thereof will ne omitted. In step 605, the network node sets up radio link connection information (i.e. FA information, a physical/higher layer cell ID, code information for an SCH and a pilot channel, cell configuration information, etc.) for public cell(s) overlapping the private cell, which is a target for the handover, and accessible by the UE. Subsequently, in step 607, the network node transmits an RRC (Radio Resource Control) connection setup message, a measurement control message, or a handover command message to the UE. The transmitted RRC connection setup/measurement control/handover command message includes the radio link connection information.

In order to avoid confusion with the above UE-related embodiments, it should be noted that the measurement report message in step 601 is different from the inventive measurement described in FIGS. 4 and 5. That is, the inventive measurement is measurement for public cells overlapping a private cell, and the measurement report message received in step 601 is not measurement for public cells, but is a message reporting a result of measurement performed for determining if handover to a private cell is needed. In conclusion, the inventive measurement is used to connect a radio link to the public cell when a radio link to the private cell is released after the UE transmits the measurement report message in step 601, receives a handover command from the network node, and then performs handover to the private cell.

For reference, a brief description will be given of the above messages including the radio link connection information.

The RRC connection setup message is transmitted in response to an RRC connection request including UE context information, received from a UE that is in an idle mode. Thus, the RRC control message includes an ID that the UE will use in a cell, radio channel configuration information, etc. The measurement control message includes measurement-related control information. The measurement control message instructs a UE to perform measurement for new neighboring cells, and others. The handover command message is a message instructing a UE to handover to a specific cell. That is, the handover command message is a message used when the network node instructs a UE located in a public cell to handover to a private cell, and vice versa, or to handover between specific cells.

Among the messages, the RRC connection setup message or the measurement control message is transmitted when a UE needs to be informed of radio link connection information for public cell(s) overlapping a private cell accessible by the UE. Also, the handover command message is transmitted when a UE needs to handover to another cell, and if the UE additionally needs to be informed of information on public cell(s), includes radio link connection information for the public cell(s).

Although the above RRC connection setup, measurement control, and handover command messages have been described as a message including radio link connection information for public cell(s) by way of example, other messages may also be used.

Figure 7:
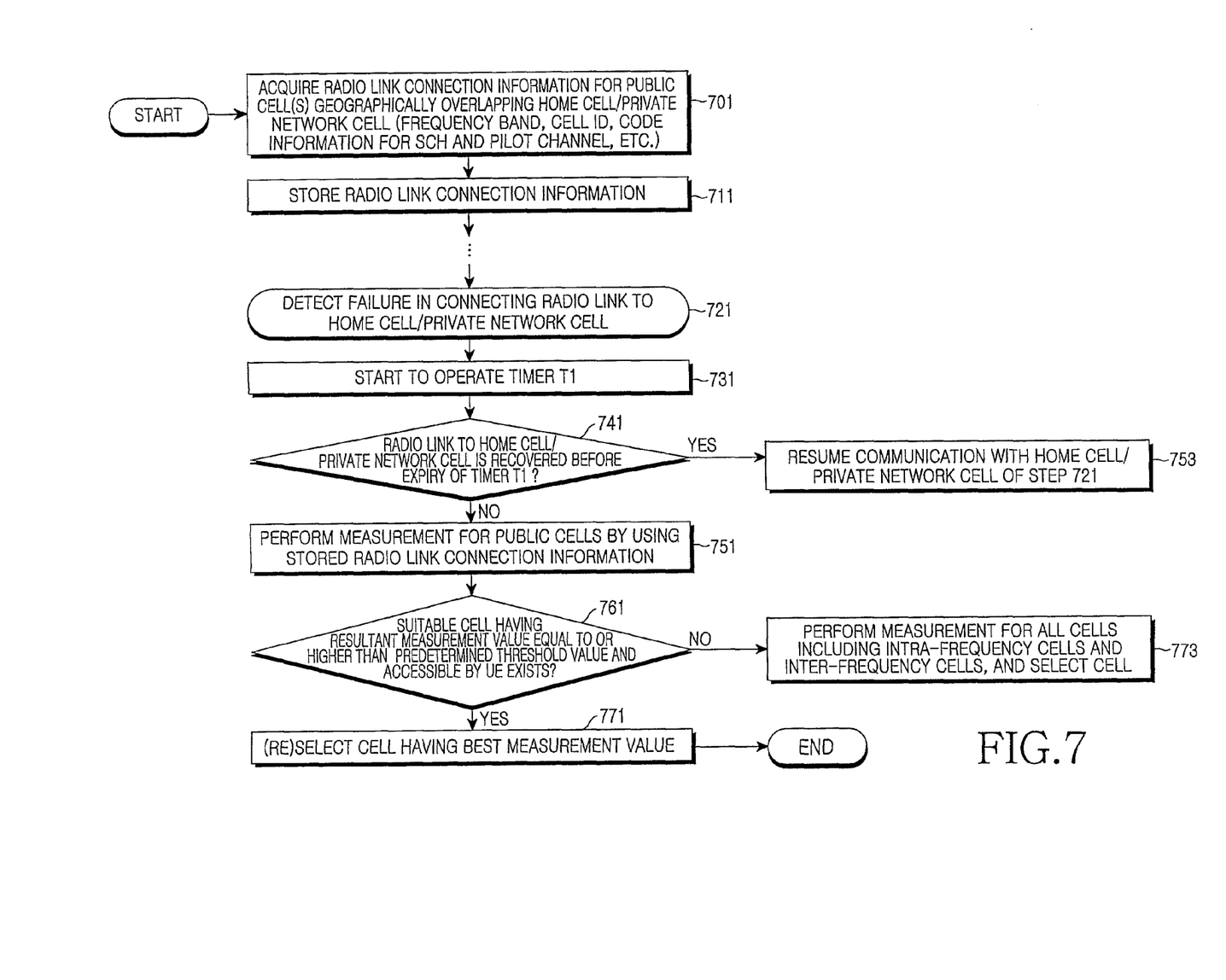
FIG. 7 is a flowchart illustrating an operation of a UE in accordance with an exemplary embodiment of the present invention.

FIG. 7 illustrates an operation of a UE according to an exemplary embodiment of the present invention.

In step 701, the UE acquires radio link connection information for public cell(s) overlapping a private cell currently assessable by the UE. The radio link connection information for public cell(s) includes FA information, a cell ID, code information for an SCH and a pilot channel, cell configuration information, etc., as mentioned above. The UE may acquire the radio link connection message via a specific message from a network node, as described in FIG. 6, or may acquire through measurement. On acquiring the radio link connection information, the UE stored the acquired radio link connection information in step 711.

Thereafter, the UE may be provided with services from the private cell. This process of providing the services is not omitted in FIG. 7. This omitted process is indicated by the dotted line.

The UE may detect a failure in connecting a radio link to the private cell in the process of receiving the services or attempting to connect the radio link to the private cell in order to be provided with the services. That is, in step 721, if the UE detects a failure in connecting a radio link to the private cell, it proceeds to step 731, and drives a timer T1 set to a given time period value and provided in the UE. Subsequently, the UE proceeds to step 741, and checks if the radio link to the private cell is recovered before the given time period value of the timer T1 expires. If a result of the check in step 741 shows that the radio link is recovered before the given time period value of the timer T1 expires, the UE proceeds to step 753, and resumes communication with the private cell.

However, if a result of the check in step 741 shows that the radio link is not recovered until the given time period value of the timer T1 expires, the UE proceeds to step 751, and performs measurement for the public cell(s) by using the radio link connection information for the public cell(s), stored in step 711. Subsequently, in step 761, the UE checks if there are suitable cells that have a measurement value equal to or higher than a predetermined threshold value, as a result of the measurement in step 751, and are accessible by the UE. If a result of the check in step 761 shows that there are suitable cells satisfying the above conditions, the UE proceeds to step 771, and selects a public cell having the best measurement value from among the public cells satisfying the above conditions.

However, if a result of the check in step 761 shows that there is no suitable cell satisfying the above conditions, the UE proceeds to step 773, and performs cell selection through measurement for all cells including intra-frequency cells and inter-frequency cells.

Figure 8:
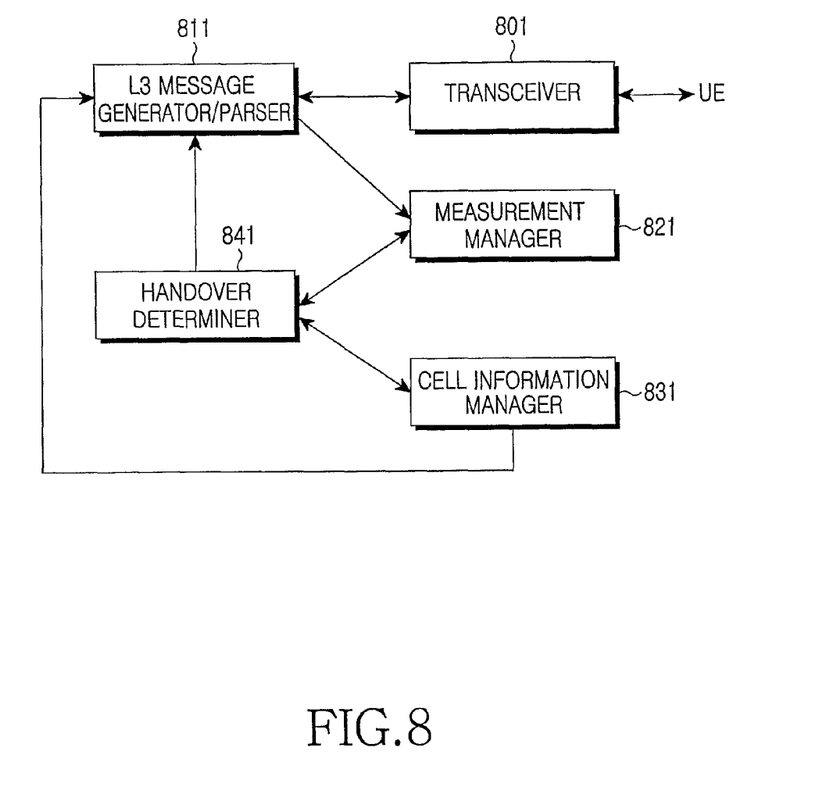
FIG. 8 is a block diagram illustrating a structure of a network node in accordance with an exemplary embodiment of the present invention.

FIG. 8 illustrates a main structure of a network node according to an exemplary embodiment of the present invention. It should be noted that the main structure illustrated in FIG. 8 includes only constituent elements necessary for explaining the present invention.

A cell information manager 831 prestores radio link connection information for a private cell and radio link connection information for public cell(s) overlapping the private cell. When a UE moves to another area in the process of transmitting/receiving data, it transmits a measurement report message to a network node so as to determine if handover is needed. The measurement report message is transmitted/received through a transceiver 801 of the network node. The transceiver 801 is a processor including a radio unit, a modem, and the like for transmitting/receiving signaling information and data to/from a UE. The transceiver 801 transfers the measurement report message to an L3 message generator/parser 811.

If the L3 message generator/parser 811 forwards the transferred measurement report message to a measurement manager 821, the measurement manager 821 stores the measurement report message, and then forwards the stored measurement report message to a handover determiner 841. The handover determiner 841 determines whether or not the UE needs to handover to the private cell, by using the measurement report message and the radio link connection information for the private cell, forwarded from the cell information manager 831. If the handover determiner 841 determines that the UE needs to handover to the private cell, the radio link connection information for the public cell(s), stored in the cell information manager 831, is forwarded to the handover determiner 841. Subsequently, the handover determiner 841 forwards the radio link connection information for the public cell(s) to the L3 message generator/parser 811.

The L3 message generator/parser 811 transmits a handover message including the radio link connection information for the public cell(s) to the UE through the transceiver 801, thereby instructing the UE to handover to the private cell. As mentioned above, an RRC connection setup message or a measurement control message may also be used in place of the handover message.

Figure 9:
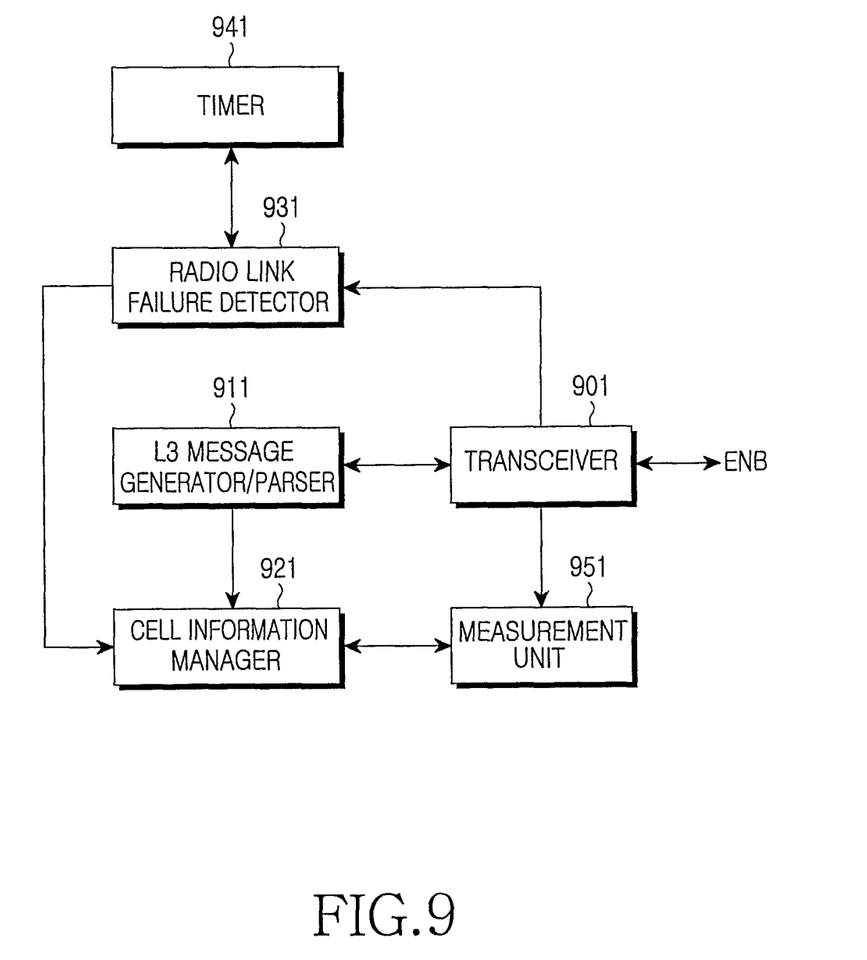
FIG. 9 is a block diagram illustrating an internal structure of a UE in accordance with an exemplary embodiment of the present invention.

FIG. 9 illustrates an internal structure of a UE according to an exemplary embodiment of the present invention. It should be noted that the internal structure illustrated in FIG. 9 covers only a structure according to the present invention.

The UE also has a transceiver 901. The transceiver 901 is a unit for transmitting/receiving signaling information and data to/from a network node, for example, an ENB, and includes a radio unit, a modem, etc. Among messages received from the network node, the transceiver 901 transfers an L3 message to an L3 message generator/parser 911.

The L3 message generator/parser 911 forwards the transferred L3 message to a cell information manager 921. When radio link connection information for a private cell and radio link connection information for public cell(s) overlapping the private cell are included in the parsed L3 message, the cell information manager 921 stores the included information in a memory (not illustrated), which in turn stores the information in a cell information list.

A radio link failure detector 931 checks if a radio link failure is detected, by using the information received from the transceiver 901, and then drives a timer T1 941 having a preset time period value when a radio link failure is detected. The radio link failure detector 931 checks if the radio link is recovered until the time period value set in the timer T1 941 expires. If the radio link is not recovered until the time period value of the timer T1 941 expires, the radio link failure detector 931 forwards a message, indicating that a radio link connection has failed, to the cell information manager 921.

In response to the forwarded message, the cell information manager 921 forwards the radio link connection information for the pubic cell(s), stored in the memory, to a measurement unit 951. The measurement unit 951 performs measurement for the public cell(s) by using the forwarded radio link connection information and signals (e.g. pilot signals) from the public cell(s), received in the transceiver 901. Subsequently, the measurement unit 951 compares the resultant measurement values with a predetermined threshold value, and selects a suitable cell that satisfies cell selection conditions, as a result of the comparison. If there are a plurality of public cells satisfying the cell selection conditions, a cell having the best measurement value is selected from among the public cells. However, the function of selecting a cell by comparing the resultant measurement values with the predetermined threshold value may also be performed in a separate functional unit (e.g. cell selector).

Nevertheless, in the case of an embodiment where there is one overlapped public cell and measurement is not performed, as in the left path of FIG. 4, the radio link connection information received from the cell information manager 921 is information for one public cell, and thus the measurement unit 951 directly selects the one public cell without performing measurement.

In the following, a description will be given of a structure of a UE, which may be configured in a different manner from FIG. 9, with reference to FIG. 10.

Figure 10:
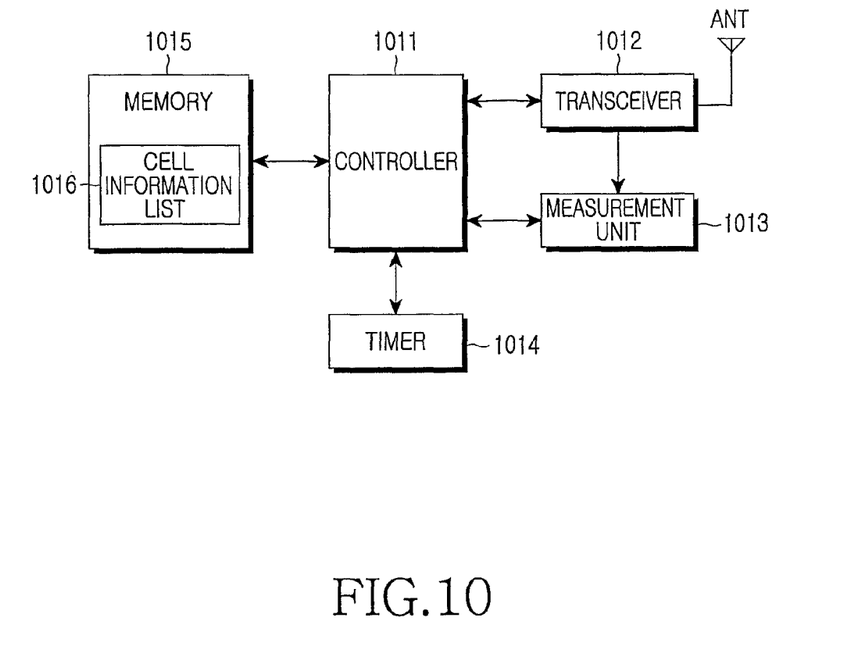
FIG. 10 is a block diagram illustrating a structure of a UE in accordance with another exemplary embodiment of the present invention.

FIG. 10 illustrates a structure of a UE according to another exemplary embodiment of the present invention. A transceiver 1012 includes a modem for data modulation and demodulation, and radio processors and amplifiers for up- and down-converting a transmitted signal into an RF signal. The transceiver 1012 extracts a signal for searching a cell meeting specific conditions, and outputs the extracted signal to a measurement unit 1013.

The transceiver 1012 transmits/receives data and signaling information to/from a network node, and forwards an L3 message among messages, received from the network node, to a controller 1011.

The controller 1011 parses the L3 message to thereby detect if a radio link connection has failed, and can generate an L3 message to be transmitted to a Node B. With regard to this, when radio link connection information for public cell(s) is included in the L3 message, the controller 1011 stores the radio link connection information in a cell information list 1016 within a memory 1015. When radio link connection information for a private cell is received, the controller 1011 may also store it in the cell information list 1016.

The controller 1011 drives a timer 1014 having a preset time period value when a radio link connection to a private cell has failed. If the failure in connecting the radio link to the private cell is maintained until the time period value set in the timer 1014 expires, the controller 1011 receives the radio link connection information stored in the cell information list 1016, and forwards it to the measurement unit 1013. Then, the measurement unit 1013 performs measurement for the relevant public cell(s) by using the radio link connection information and signals from the public cell(s), received through the transceiver 1012, and forwards the resultant measurement values to the controller 1011. The controller 1011 compares the resultant measurement values with a predetermined threshold value, and selects a suitable cell that satisfies cell selection conditions, as a result of the comparison. If there are a plurality of public cells satisfying the cell selection conditions, a cell having the best measurement value is selected from among the public cells.

However, in the case of an embodiment where there is one overlapped public cell and measurement is not performed, as in the left path of FIG. 4, the radio link connection information stored in the cell information list 1016 is information for one public cell, and thus the controller 1011 directly selects the one public cell without performing measurement.

As described above, the present invention makes it possible to quickly select a cell in a wireless communication system including different-sized cells overlapping each other by reducing a time required for cell selection, thereby enabling rapid data transmission/reception and thus improving QoS.

Also, the present invention can enhance the convenience of users by reducing power consumption of a mobile terminal due to a long cell selection time.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of connecting a radio link of a User Equipment (UE) in a wireless communication system, the method comprising the steps of:
   when the UE fails in connecting the radio link to a first cell for a given time, selecting a second cell by using prestored radio link connection information for the second cell, the second cell being different from the first cell; and
   performing:
   deciding either of one or more the selected second cell;
   cell selection or cell reselection on the selected second cell, if a number of the second cell is one, by using prestored radio link connection information without performing measurement for the selected second cell; and
   measurement for the second cell, if the number of the second cell is more than one by using the prestored radio link connection information for a plurality of second cells,
   wherein the second cell partially or completely overlaps the first cell, the first cell comprises a home cell or private network cell, and the second cell comprises a public cell.

2. The method as claimed in claim 1, wherein performing measurement further comprises, when the measurement for the second cell is performed for the plurality of second cells, one or more of which satisfy cell selection conditions, selecting a cell having a highest resultant measurement value from among the one or more cells satisfying the cell selection conditions.

3. The method as claimed in claim 2, wherein the cell selection conditions include a resultant measurement value equal to or higher than a predetermined threshold value, and the UE's accessibility to the second cell.

4. The method as claimed in claim 1, wherein the radio link connection information for the second cell includes frequency allocation information, a physical or higher layer cell ID, code information for a sync channel and a pilot channel, and cell configuration information of the second cell.

5. The method as claimed in claim 1, wherein the first cell comprises a home cell or private network cell, and the second cell comprises a public cell.

6. The method as claimed in claim 1, wherein performing measurement comprises the steps of:
   selecting a second cell from among the plurality of second cells based on the measurement result; and
   performing cell selection or cell reselection on the selected second cell by using the prestored radio link connection information.

7. An apparatus for connecting a radio link of a User Equipment (UE) in a wireless communication system, the apparatus comprising:
   a timer having a preset time period value;
   a cell information manager for storing and providing radio link connection information for a second cell;
   a radio link failure detector for driving the timer when a failure in connecting a radio link to a first cell is detected, and outputting a radio link failure message when the failure in connecting the radio link to the first cell is maintained until the preset time period value of the timer expires;
   a cell information manager for outputting the radio link connection information for the second cell in response to the output radio link failure message; and
   a measurement unit for selecting the second cell according to the output radio link connection information for the second cell, the second cell being different from the first cell,
   wherein the measurement unit is further adapted to select the second cell without performing measurement for the second cell if the number of the second cell is one, and to select the second cell from among a plurality of second cells by performing measurement for the second cell by using the radio link connection information for the plurality of second cells, and
   wherein the second cell partially or completely overlaps the first cell, the first cell comprises a home cell or private network cell, and the second cell comprises a public cell.

8. The apparatus as claimed in claim 7, wherein the measurement unit is further adapted to select a cell having a highest resultant measurement value from among one or more cells satisfying predetermined cell selection conditions when the measurement for the second cell is performed for the plurality of second cells, one or more of which satisfy the cell selection conditions.

9. The apparatus as claimed in claim 8, wherein the cell selection conditions include a resultant measurement value equal to or higher than a predetermined threshold value, and the UE's accessibility to the second cell.

10. The apparatus as claimed in claim 8, wherein the radio link connection information for the second cell includes frequency allocation information, a physical or higher layer cell ID, code information for a sync channel and a pilot channel, and cell configuration information of the second cell.

11. The apparatus as claimed in claim 8, wherein the first cell comprises a home cell or private network cell, and the second cell comprises a public cell.

* * * * *